United States Patent
Ito et al.

(10) Patent No.: US 11,816,235 B2
(45) Date of Patent: Nov. 14, 2023

(54) SEMICONDUCTOR DEVICE AND CONTROL METHOD

(71) Applicant: RENESAS ELECTRONICS CORPORATION, Tokyo (JP)

(72) Inventors: Kenichi Ito, Tokyo (JP); Akihiro Yamate, Tokyo (JP); Akira Hosotani, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 117 days.

(21) Appl. No.: 16/573,407

(22) Filed: Sep. 17, 2019

(65) Prior Publication Data

US 2020/0117814 A1 Apr. 16, 2020

(30) Foreign Application Priority Data

Oct. 15, 2018 (JP) ................. 2018-194009

(51) Int. Cl.
| | |
|---|---|
| G06F 21/64 | (2013.01) |
| G06F 21/79 | (2013.01) |
| G06F 21/72 | (2013.01) |
| G06F 21/62 | (2013.01) |

(52) U.S. Cl.
CPC .......... G06F 21/6209 (2013.01); G06F 21/64 (2013.01); G06F 21/72 (2013.01); G06F 21/79 (2013.01)

(58) Field of Classification Search
CPC ...... G06F 21/6209; G06F 21/64; G06F 21/72; G06F 21/79
See application file for complete search history.

(56) References Cited

U.S. PATENT DOCUMENTS

| | | | | |
|---|---|---|---|---|
| 7,885,405 B1 * | 2/2011 | Bong | ............... | H04L 9/0637 |
| | | | | 713/153 |
| 8,275,128 B2 | 9/2012 | Nakagoe et al. | | |
| 11,200,312 B1 * | 12/2021 | Greve | ............... | G06F 13/24 |

(Continued)

FOREIGN PATENT DOCUMENTS

JP 2009-115857 A 5/2009

*Primary Examiner* — Trang T Doan
*Assistant Examiner* — Vladimir I Gavrilenko
(74) *Attorney, Agent, or Firm* — McDermott Will & Emery LLP

(57) ABSTRACT

The semiconductor device includes a control unit having redundant processors, a memory storing target data, a secure memory storing a key used for encryption or decryption processing, an cryptographic unit, a secure processor instructing cryptographic processing to the cryptographic unit in response to a request from the control unit, a first bus coupled to the control unit, the memory, the cryptographic unit, and the secure processor, and a second bus coupled to the secure memory, the cryptographic unit, and the secure processor. The control unit communicates with the memory via a predetermined error detection mechanism, the cryptographic unit includes a plurality of cryptographic processors that independently perform cryptographic processing on target data using a key based on an instruction, and each of the plurality of cryptographic processors includes a data transfer unit that performs data transfer with the memory via the error detection mechanism.

9 Claims, 14 Drawing Sheets

(56) References Cited

U.S. PATENT DOCUMENTS

| | | | |
|---|---|---|---|
| 2014/0189340 A1* | 7/2014 | Hadley | G06F 21/72 |
| | | | 713/2 |
| 2015/0339201 A1* | 11/2015 | Kanekawa | G06F 11/1616 |
| | | | 714/6.11 |
| 2019/0088350 A1* | 3/2019 | Matsumoto | G11C 29/52 |
| 2020/0104266 A1* | 4/2020 | Chhabra | G06F 12/1408 |

* cited by examiner

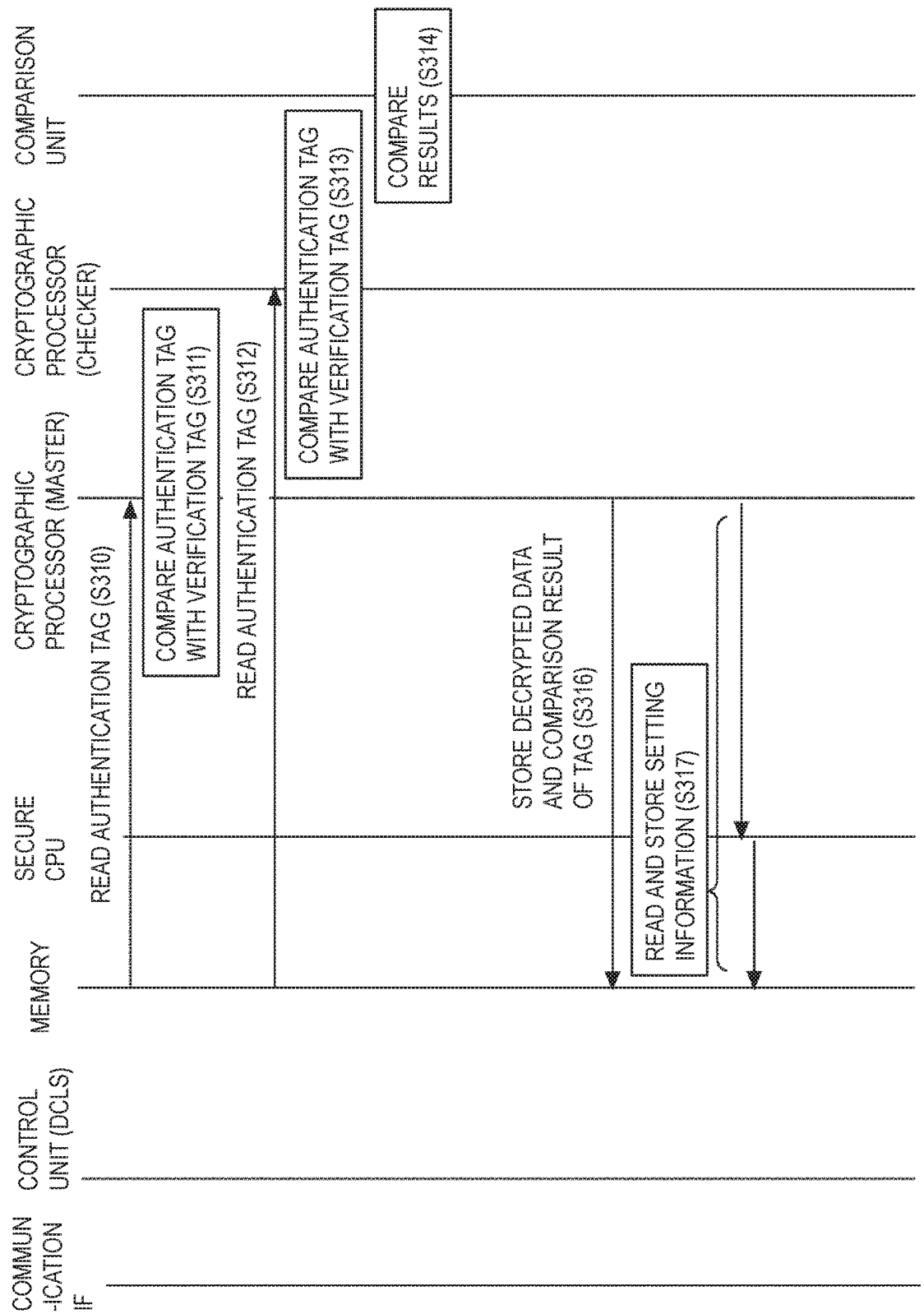

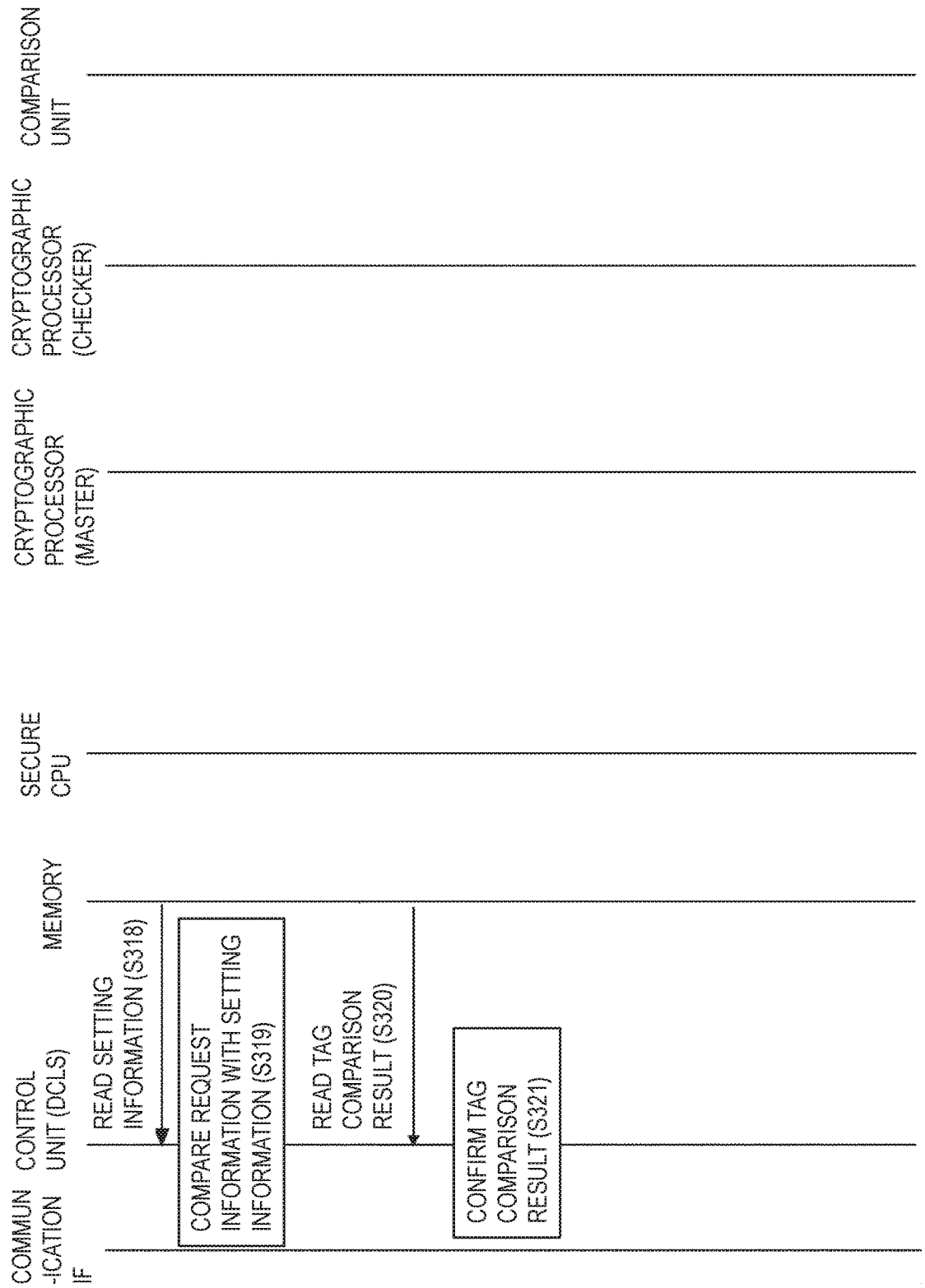

SEMICONDUCTOR DEVICE AND CONTROL METHOD

CROSS-REFERENCE TO RELATED APPLICATIONS

The disclosure of Japanese Patent Application No. 2018-194009 filed on Oct. 15, 2018 including the specification, drawings and abstract is incorporated herein by reference in its entirety.

BACKGROUND

The present disclosure relates to semiconductor device and methods of controlling the same.

In recent years, in the field of ECUs (Electronic Control Unit), which are examples of semiconductor device, security requirements for preventing threats by malicious third parties in communication between ECUs have increased in importance. At the same time, communication between ECUs must also meet functional safety requirements to manage the risk of malfunction. As an example of an encryption technique for realizing high-security, Advanced Encryption Standard is known as an example of the encryption technique. Patent Document 1 discloses a technique for realizing a highly reliable storage system by duplicating an AES (Advanced Encryption Standard) circuit and a parity generation unit.

PRIOR-ART DOCUMENT

Patent Document

[Patent Document 1] Japanese Unexamined Publication Laid-Open No. 2009-115857

SUMMARY

However, simply duplicating the AES circuit as described in Patent Document 1 cannot detect a failure of another configuration, and therefore, the functional safety requirements cannot be sufficiently satisfied. Therefore, it is also conceivable to duplicate the entire configuration of the semiconductor device related to the security function, but this increases the size of the security circuit.

Other objects and novel features will become apparent from the description of this specification and the accompanying drawings.

According to one embodiment, in the semiconductor device, the control unit made redundant by the plurality of processors performs communication with the memory via a predetermined error detecting mechanism, the encryption unit includes a plurality of encryption processing units that independently perform encryption processing on target data using a key based on an instruction, and each of the plurality of encryption processing units includes a data transfer unit that performs data transfer with the memory via an error detecting mechanism.

According to the above-mentioned embodiment, it is possible to satisfy both the security requirement and the functional safety requirement while suppressing an increase in the size of circuits in the semiconductor device.

BRIEF DESCRIPTION OF THE DRAWINGS

FIG. 13 is a sequence diagram showing a flow of receiving, decrypting and verifying data according to the second embodiment.

FIG. 14 is a sequence diagram showing a flow of receiving, decrypting and verifying data according to the second embodiment.

DETAILED DESCRIPTION

Figure 1:
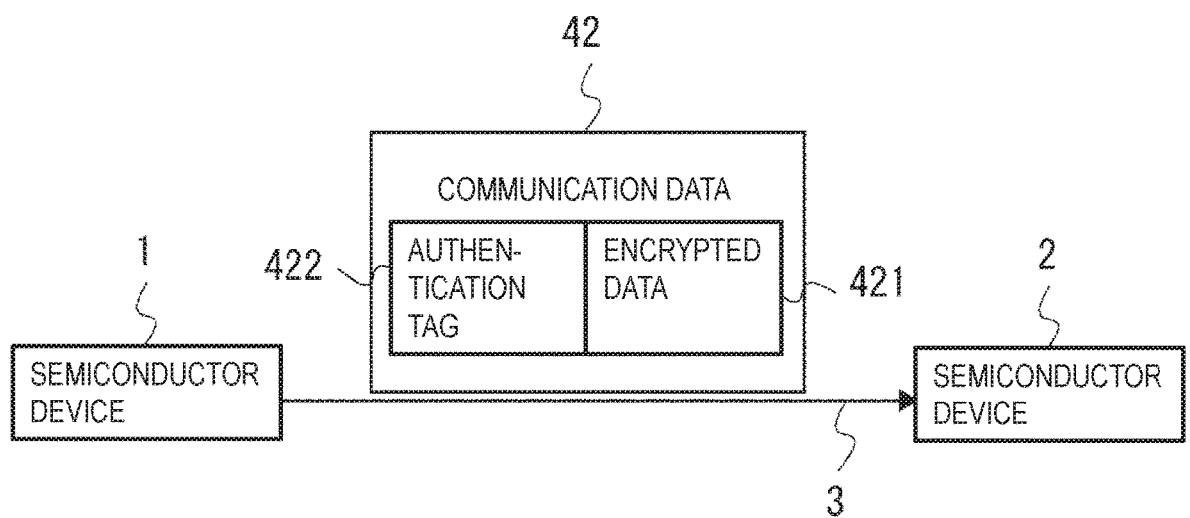
FIG. 1 is a block diagram showing the concepts of communication between the two semiconductor devices according to a first embodiment.

For clarity of explanation, the following description and drawings are appropriately omitted and simplified. In addition, the elements described in the drawings as functional blocks for performing various processes can be configured as CPUs (Central Processing Unit), memories, and other circuits in terms of hardware, and are realized by programs loaded into the memories in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

Here, the following art according to the present embodiment will be supplemented. One approach to confirming the authenticity of messages in communication is to assign a message authentication code (Message Authentication Code: MAC) to the sender of the data (message) and confirm (verify) the MAC to the receiver. In addition, the authenticity of messages has been mainstream as security requirements in the communication of ECUs (Electronic Control Unit) for automobiles. In recent years, the security requirement has been required not only for authenticity but also for confidentiality. Therefore, as a technique for simultaneously satisfying the authenticity and confidentiality of messages, there are cryptographic algorithms with authenticity such as AES-GCM (Galois/Counter Mode). The AES-GCM is a technique for performing encryption of a message and authenticating the message at the same time by using a symmetric key.

In addition, in communication between ECUs mounted in automobiles, it is required to check whether communication data has failed or not in an end-to-end (End to End) manner in order to satisfy functional safety requirements. Examples of safety mechanisms for end-to-end detection of communication data for faults include CRC (Cyclic Redundancy Check) and ECC (Error Correction Code)/EDC (Error Detection Code). However, a method of providing and confirming the MAC described above can also be used for failure detection. Therefore, when a method of assigning and confirming MACs is applied to secure IP (Intellectual Property) in a semiconductor device having high security requirements, the secure IP itself can be treated as one of security mechanisms.

Here, some problems to be solved by the present embodiment will be described. First, when data for satisfying functional safety requirements is communicated between ECUs, if an authenticated encryption such as AES-GCM is applied to the data by secure IP, failure detection may not be possible end-to-end. The reason for this is that, in the encryption with authentication, since encryption and tag generation or decryption and tag verification are performed simultaneously, there is a possibility that communication is established when a failure occurs. For example, even if encryption is performed incorrectly due to a failure of the encryption engine, a tag corresponding to encrypted data is generated due to an incorrect encryption process. In this case, on the receiving side, the tag correctly generated from the erroneously encrypted data coincides with the tag generated on the transmitting side corresponding to the erroneously encrypted data added to the received data. Therefore, on the receiving side, the tag verification succeeds, and the decoding process can be performed normally, so that there is a case where the communication is established due to erroneous data.

Alternatively, even if the decryption is an incorrect treatment (incorrect decryption) due to the failure of the cryptographic engine, if the tag generated for verification from the received data is correct, the verification of the tag assigned to the received data is succeeded. Therefore, even if the decoded data is erroneous, communication may be established.

Further, in the case of the method of detecting and correcting errors by duplicating the AES circuit and parity generation as described in Patent Document 1, only the cryptographic engine is duplicated. However, in this case, since the CPU (secure CPU) in the secure IP performs data transfer between the memory and the cryptographic engine outside the secure IP, the failure of the data communication intervened by the secure CPU or the failure of the secure CPU itself cannot be detected.

Here, as a security mechanism, it is considered that the entire secure IP including the secure CPU and the cryptographic engine is duplicated. However, in this case, the influence on the cost due to the increase in the chip size becomes large. In other words, if the security requirements and the functional safety requirements are satisfied in the semiconductor device, there arises a problem that the circuit size is increased.

In addition, a countermeasure for performing failure detection by attaching a CRC to the target data before the target data is processed by the authenticated encryption may be considered. However, in this case, since the calculation processing of CRC is increased as compared with the case where only the authenticated encryption is applied, the overhead of the transmission/reception processing is increased. In addition, it is also conceivable that the processor performs the same operation such as the cryptographic processing twice, which is duplication by software. However, even in this case, the overhead of the transmission/reception processing becomes large.

From the above, an embodiment for solving at least one of these problems will be described below.

First Embodiment

FIG. 1 is a diagram showing concepts of communication between two semiconductor devices 1 and 2 according to the first embodiment. The semiconductor devices 1 and 2 are connected to each other by a signal line 3, and data can be communicated with each other. It is assumed that the semiconductor devices 1 and 2 can encrypt (encryption) and decrypt (decryption) the data to be communicated by using a common key held in advance by both of them by using predetermined cryptographic process (cryptographic processing) algorithms. It is also assumed that the cryptographic processing algorithm can generate and verify a MAC from the target data. It is also assumed that the semiconductor devices 1 and 2 have the same function and can interchange the transmitting side and the receiving side with each other. The semiconductor devices 1 and 2 are, for example, microcomputers, MCUs (Micro Control Unit), SoCs (System on Chip), ECUs, and the like, and may be mounted on the same or different automobiles. The semiconductor devices 1 and 2 may also be referred to as semiconductor chips.

Here, it is assumed that the semiconductor device 1 encrypts the data to be communicated by a predetermined encryption algorithm using the common key to generate encrypted data 421, and also generates an authentication tag 422. The authentication tag 422 is an example of a message authentication code. Then, the semiconductor device 1 transmits the communication data 42 including the encrypted data 421 and the authentication tag 422 to the semiconductor device 2, which is the receiving side, via the signaling line 3. Then, the semiconductor device 2 receives the communication data 42 via the signal line 3, decrypts the encrypted data 421 included in the communication data 42 by a predetermined cryptographic process algorithm using the common key to generate decrypted data (not shown), and also generates verification tag (not shown). Then, the semiconductor device 2 compares the verification tag generated by itself with the authentication tag 422 included in the received communication data 42, and when the verification is performed, it determines that the decrypted data has been normally received, and uses the decrypted data for subsequent processing.

Figure 2:
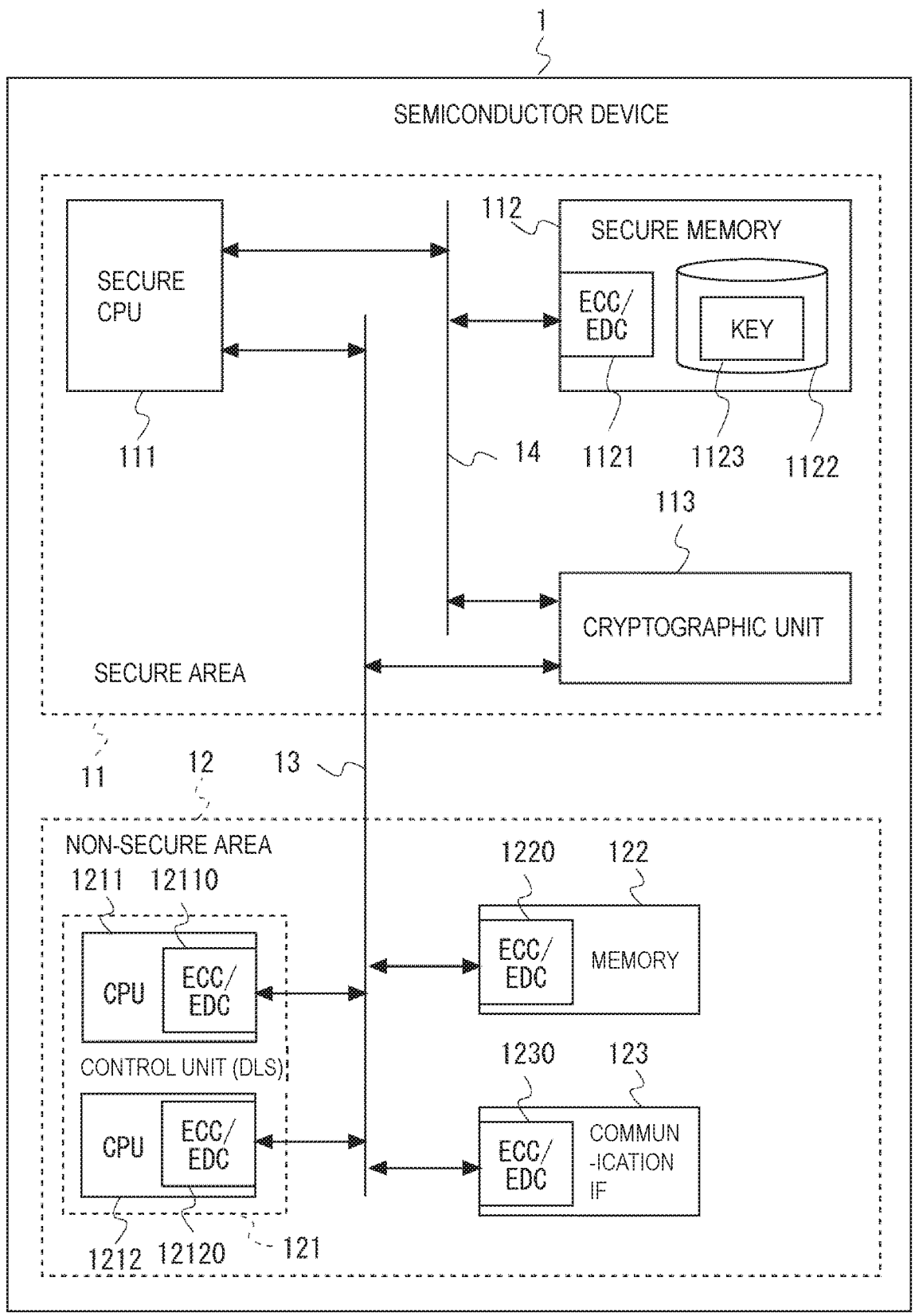
FIG. 2 is a diagram showing a configuration of a semiconductor device according to the first embodiment.

FIG. 2 is a diagram showing the configuration of the semiconductor device 1 according to the first embodiment. Semiconductor device 1 supports security requirements and functional safety requirements. The semiconductor device 1 includes a secure CPU 111, a secure memory 112, a cryptographic unit 113, a control unit 121, a memory 122, and a communication interface (IF) 123. Here, the secure CPU 111, the secure memory 112, and the cryptographic unit 113 belong to the secure area 11, and the control unit 121, the memory 122, and the communication IF 123 belong to the non-secure area 12. The secure CPU 111 belonging to the secure area 11, the secure memory 112, and the cryptographic unit 113 may be collectively referred to as secure IP. The secure CPU 111, the cryptographic unit 113, the control unit 121, the memory 122, and the communication IF 123 except for the secure memory 112 are communicably connected via the main bus 13. The secure CPU 111, the secure memory 112, and the cryptographic unit 113 are communicably connected via a second bus 14. That is, the control unit 121 or the like of the non-secure area 12 cannot directly access the secure memory 112 of the secure area 11.

The secure CPU 111 is a processor that instructs the cryptographic unit 113 to perform an encryption process in response to a request from the control unit 121. The secure CPU 111 reads the key from the secure memory 112 and sets the key in the cryptographic unit 113 at the time of instructing the encryption process. The secure CPU 111 sets the setting information including the input/output addresses of the memories 122 and the types of cryptographic processing algorithms included in the requests in the cryptographic unit 113 at the time of instructing the cryptographic processing. The secure CPU 111 stores the setting information in the memory 122.

The secure memory 112 is a volatile or nonvolatile storage device. Secure memory 112 includes an ECC/EDC 1121 and storage area 1122. The ECC/EDC 1121 is an example of an error detecting mechanism. Here, the "error detection mechanism" is a system including "error detection" or "error detection and error correction". Therefore, the ECC/EDC 1121 may detect or correct an error with respect to the data in the storage area 1122.

The storage area 1122 stores the key 1123. The key 1123 is key data used for encryption processing for encryption or decryption. Here, it is assumed that the key 1123 is a common key between semiconductor devices 1 and 2.

The cryptographic unit 113 performs encryption processing. Here, the cryptographic process is, for example, a process using an authenticated cryptographic algorithm such as AES-GCM, and includes data encryption and tag generation, or data decryption and tag verification. However, the authenticated cryptographic algorithms are not limited to AES-GCM. The internal configuration of the cryptographic unit 113 will be described later.

The control unit 121 is a functional block made redundant by a plurality of processors. It is assumed that the control unit 121 is made redundant by CPU 1211 and CPU 1212 in accordance with the DCLS (Dual Core Lock Step) system. Therefore, the control unit 121 satisfies the functional safety requirements. The CPU 1211 has the ECC/EDC 12110, and can detect or correct an error in transmission/reception data to/from the ECC/EDC of another configuration via the main bus 13 using the ECC/EDC 12110. In addition, the CPU 1212 has the ECC/EDC 12120, and can similarly detect or correct errors in transmission/reception data. One of the CPU 1211 and 121 is a master and the other is a checker. The checker executes the same processing as the master several clocks after the processing of the master. The master accesses to other components via the main bus 13 when both processing results by the master and checker are matched. However, the control unit 121 may have a redundancy configuration by another method.

The memory 122 is a volatile or nonvolatile storage device. The memory 122 includes an ECC/EDC 1220 and a storage area (not shown). Therefore, it can be said that the control unit 121 communicates with the memory 122 via the ECC/EDC.

The communication IF 123 is an interface that communicates with the semiconductor device 2 outside the semiconductor device 1, for example, via the signal line 3.

It should be noted that CRCs may be employed instead of ECC/EDC as error detecting mechanisms used in the above-described configurations.

Figure 3:
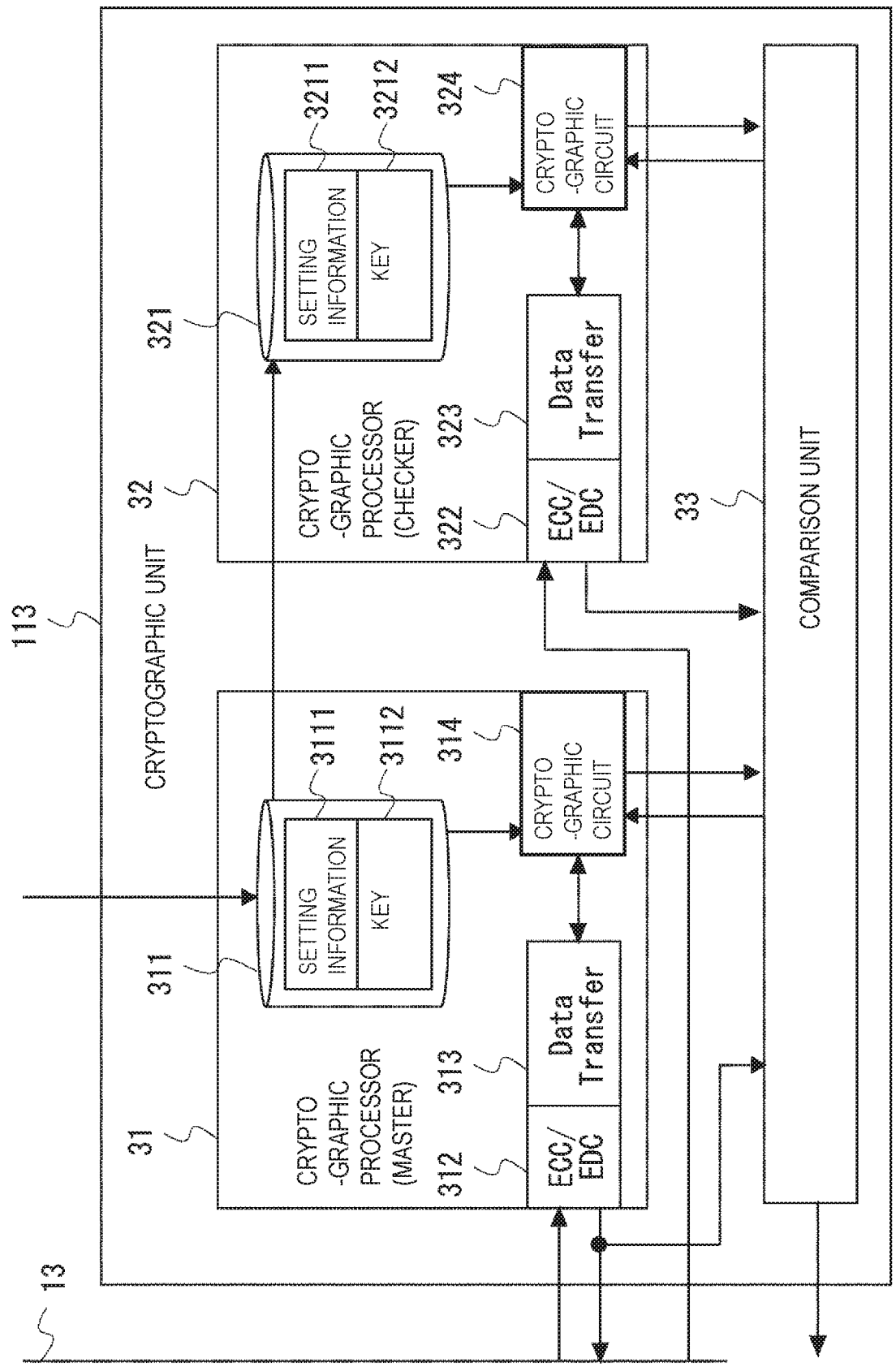
FIG. 3 is a block diagram showing an internal configuration of an encryption unit according to the first embodiment.

FIG. 3 is a block diagram showing an internal configuration of the cryptographic unit 113 according to the first embodiment. The cryptographic unit 113 includes an cryptographic processors 31 and 32, and a comparison unit 33. Each of the cryptographic processors 31 and 32 independently performs cryptographic processing on the target data stored in the memory 122 by using the key 1123 based on the cryptographic processing instruction from the secure CPU 111.

The cryptographic processor 31 is a master cryptographic engine, and includes a storage unit 311, an ECC/EDC 312, a data-transfer unit 313, and a cryptographic circuit 314. The storage unit 311 is a storage area such as a register, and stores setting information 3111 and a key 3112 set by the secure CPU 111. The setting information 3111 includes an address which is an access destination in the memory 122, and a type of an arithmetic algorithm of the cryptographic process. The types may be, for example, an AES-GCM calculation mode or types of calculation algorithms. The key 3112 is set with the above-described key 1123, and is a common key. It is assumed that the storage unit 311 has a mechanism for copying data to be stored or updated to the storage unit 321 in the cryptographic processor 32. Instead of this mechanism, however, the secure CPU 111 may store the same data in both of the storage units 311 and 321.

The ECC/EDC 312 can detect or correct errors in transmission/reception data to/from the ECC/EDC of another component via the main bus 13. The data transfer unit 313 performs data transfer with another component directly via the main bus 13 without using the secure CPU 111.

The cryptographic circuit 314 uses the key 3112 to perform the AES-GCM operation in the operation mode corresponding to the type included in the setting information 3111. The cryptographic circuit 314 performs the AES-GCM operation (cryptographic process) on the target data acquired from the data transfer circuit 313. At this time, in the case of encryption, the cryptographic circuit 314 encrypts the target data and generates the authentication tag as encryption processing. In the case of decryption, the cryptographic circuit 314 decrypts the target data and generates a verification tag as cryptographic processing. Then, the cryptographic circuit 314 outputs the processing result of the cryptographic processing to the comparison unit 33. Here, the processing result is encrypted data and the authentication tag in the case of encryption, and is decrypted data and the verification tag in the case of decryption. In addition, the cryptographic circuit 314 outputs the result to the data transfer unit 313 and stores the result in the memory 122 via the ECC/EDC 312.

The cryptographic processor 32 is a checker cryptographic engine, and includes a storage unit 321, an ECC/EDC 322, a data-transfer unit 323, and a cryptographic circuit 324. Since the storage unit 321, the ECC/EDC 322, the data-transfer unit 323, and the cryptographic circuit 324 are generally the same as those in the cryptographic processor 31, the difference from the cryptographic processor 31 will be described here. The storage unit 321 stores setting information 3211 and a key 3212. Here, as described above, the setting information 3211 and the key 3212 are data stored or updated in the storage unit 311, that is, the same data as the setting information 3111 and the key 3112.

The cryptographic circuit 324 notifies the comparison unit 33 of its own processing result, but unlike the cryptographic circuit 314 because it is for the checker, it does not output its own processing result to the main bus 13 through the data transfer unit 313.

The comparison unit 33 is an example of a failure detection circuit, and detects a failure of either of the cryptographic processors 31 and 32 by comparing the processing results of the cryptographic processing of the cryptographic circuits 314 and 324. The comparison unit 33 determines that there is no failure (failure is not detected) when the processing results match, and that there is a failure (failure is detected) when the processing results do not match. When detecting a failure, the comparison unit 33 outputs the fact to at least the outside of the cryptographic unit 113. For example, the comparison unit 33 outputs the fact that the failure has been detected to the secure CPU 111, the control unit 121, or the outside of the semiconductor device 1. When detecting a failure, the comparison unit 33 may notify the cryptographic circuits 314 and 324.

Figure 4:
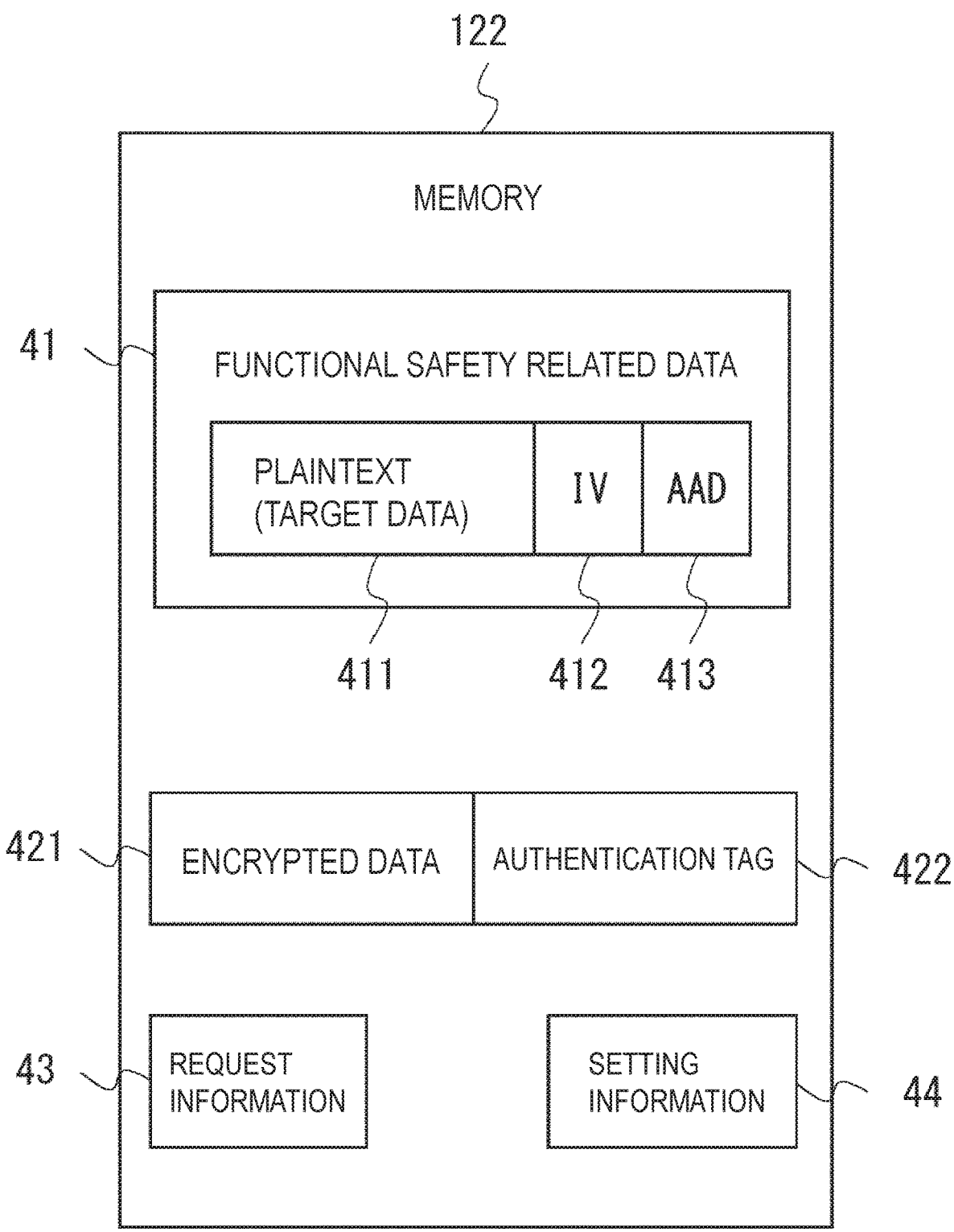
FIG. 4 illustrates an example of data stored in a transmitter memory according to the first embodiment.

FIG. 4 is a diagram showing examples of data stored in the memory 122 in the transmission-side semiconductor device 1 according to the first embodiment. The memory 122 stores a functional safety related data 41, the encrypted data 421, the authentication tag 422, the request information 43, and the setting information 44. The functional safety related data 41 includes plaintext 411, IV (Initialization Vector) 412, and AAD (Additional Authenticated Data) 413, which are data to be transmitted. Note that IV 412 and AAD 413 are examples of data used for AES-GCM, and are not limited to these data. The encrypted data 421 and the authentication tag 422 are processing results of encryption processing (encryption and tag generation) by the cryptographic circuit 314. The request information 43 is information used when the control unit 121 requests the secure CPU 111 to encrypt the plaintext 411. The request information 43 includes, for example, an address in the memory 122 in which the functional safety related data 41 is stored, and an address in the memory 122 for storing the encrypted data 421, the authentication tag 422, and the setting information 44. That is, the request information 43 includes input/output addresses for the data transfer units 313 and 323 to access the memory 122. The request information 43 includes the type of the calculation algorithm of the cryptographic process. The setting information stores the setting information 3111 or 3211 set in the cryptographic unit 113 by the secure CPU 111 in the memory 122.

Figure 5:
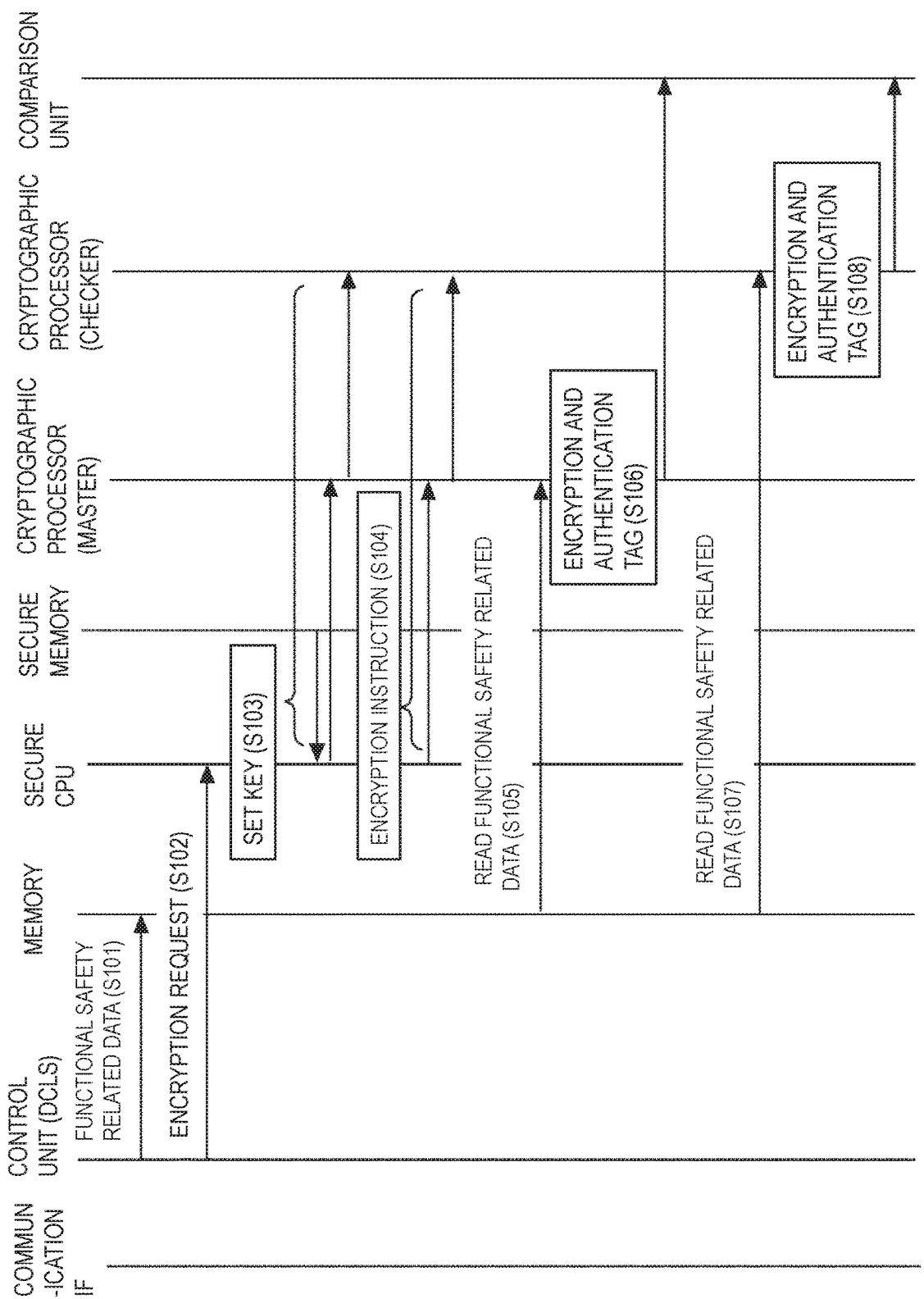
FIG. 5 is a sequence diagram illustrating a flow of encryption, verification and transmission processing of data according to the first embodiment.
Figure 6:
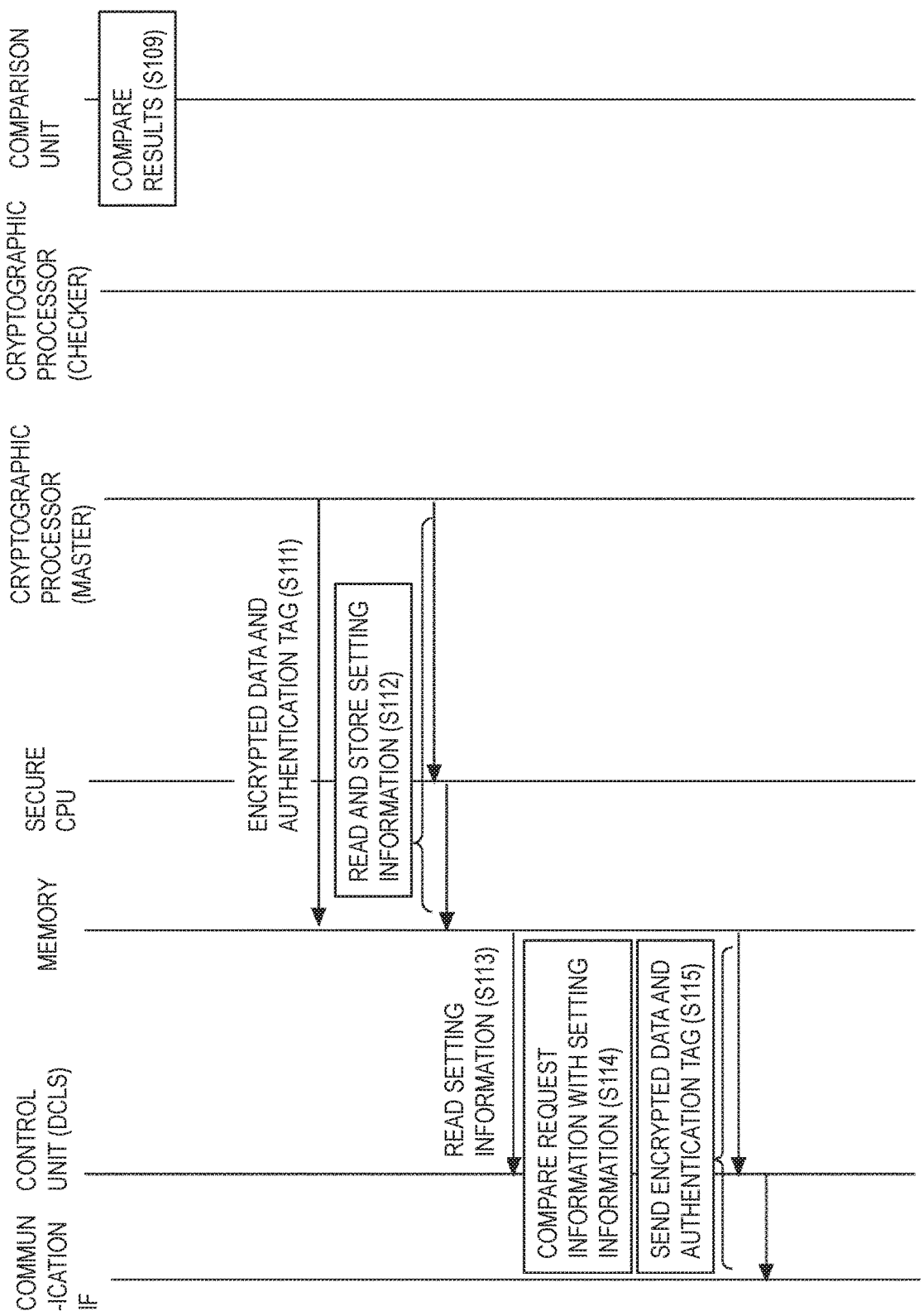
FIG. 6 is a sequence diagram illustrating a flow of encryption, verification and transmission processing of data according to the first embodiment.

FIGS. 5 and 6 are sequence diagrams showing a flow of data encryption, verification, and transmission processing according to the first embodiment. First, the control unit 121 stores the functional safety related data 41 including the plaintext 411, which is data to be transmitted, in the S101 unit 122. Next, the control unit 121 makes an encryption request for requesting the secure CPU 111 to encrypt the plaintext 411 and generate the authentication tag (S102). The encryption request includes request information 43. The control unit 121 may store the request information 43 in the memory 122 at this timing.

The secure CPU 111 sets a key to the cryptographic unit 113 (S103). Specifically, the secure CPU 111 reads the key 1123 from the secure memory 112 in response to the encryption request from the control unit 121, and sets, that is, stores, the key 1123 in the cryptographic unit 113. At this time, the secure CPU 111 stores the key 1123 at least in the storage unit 311 of the cryptographic processor 31. Then, for example, the key 3112 stored in the storage unit 311 is copied to the storage unit 321 as the key 3212 by the above-described mechanism.

Subsequently, the secure CPU 111 issues an encryption instruction to the cryptographic unit 113 in response to the encryption request from the control unit 121 (S104). Specifically, the secure CPU 111 extracts the input/output addresses of the memories 122 and the types of calculation algorithms of the encryption process from the request information included in the encryption request, and puts the extracted addresses into the encryption instruction as setting information. The secure CPU 111 stores the setting data 3111 at least in the storage unit 311 of the cryptographic unit 31. Then, for example, the setting information 3111 stored in the storage unit 311 is copied to the storage unit 321 as the setting information 3211 by the above-described mechanism.

Thereafter, the cryptographic processors 31 and 32 perform encryption processing independently of each other in response to the encryption instruction from the secure CPU 111. Although the cryptographic processors 31 and 32 are described in this order, they may be processed in parallel or may be different by several clocks.

First, the cryptographic processor 31 reads out the functional safety related data 41 from the memory 122 in response to the encryption instruction (S105). Specifically, the cryptographic processor 31 accesses the input address contained in the setting information 3111 via the main bus 13 using the data transfer unit 323 and the ECC/EDC 312, reads out the function safety-related data 41 from the memory 122, and stores the data in a register, etc. in the cryptographic processor 31.

Next, the cryptographic processor 31 performs encryption and generation of authentication tags (S106). Specifically, the cryptographic circuit 314 reads the type of the cryptographic operation algorithm included in the setting information 3111 from the storage unit 311, and specifies the AES-GCM operation mode. The cryptographic circuit 314 reads the key 3112 from the storage unit 311, and extracts the IV 412 and the AAD 413 from the functional safety-related data 41 acquired by the data transfer unit 313. Then, the cryptographic operation circuit 314 uses the key 3112, the IV 412, and the AAD 413 to calculate the AES-GCM according to the specified operation mode for the plaintext 411 included in the functional safety-related data 41. At this time, the cryptographic circuit 314 encrypts the plaintext 411 to generate encrypted data, and also generates an authentication tag. Then, the cryptographic circuit 314 outputs the generated encrypted data and the authentication tag to the comparison unit 33 as a processing result.

Similarly, in response to the encryption instruction, the cryptographic processor 32 reads out the function safety-related data 41 from the memory 122 (S107), performs encryption and generation of the authentication tag (S108), and outputs the processing result to the comparison unit 33.

Thereafter, the comparison unit 33 compares the processing results inputted from the cryptographic processors 31 and 32, respectively, and determines whether they coincide with each other or not (S109). When it is determined that the processing results do not coincide with each other, the comparison unit 33 outputs a message indicating that a failure has occurred to the outside of the cryptographic unit 113. The comparison unit 33 may also output the fact that a failure has occurred to the cryptographic circuit 314. Further, the comparison unit 33 may output a message indicating the presence of a failure to the cryptographic circuit 324.

The cryptographic circuit 314 outputs the encrypted data and the authentication tag to the data transfer unit 313 and stores them in the memory 122 via the ECC/EDC 312 (S111). After the encryption process by the cryptographic unit 113, the secure CPU 111 reads the setting information from the cryptographic unit 113 and stores the setting information in the memory 122 (S112). For example, the secure CPU 111 reads the setting information 3111 from the storage unit 311 of the cryptographic processor 31, and stores the setting information 3111 as the setting information 44 at the address outputted from the memory 122 via the main bus 13.

Thereafter, the control unit 121 reads out the request information 43 and the setting information 44 from the memory 122 (S113), compares the request information 43 and the setting information 44 (S114), and determines whether they coincide with each other or not. When it is determined that they coincide with each other, the control unit 121 determines that the secure CPU 111 has performed the encryption process as requested by the request data 43. If they do not coincide in the S114 of steps, a failure of the secure CPU 111 can be detected. That is, the functional safety requirements can be met without redundancy of the secure CPU 111 and without increasing the circuitry size for the secure CPU 111.

When it is determined that the secure CPU 111 has directed encryption processing as requested, the control unit 121 sends the encrypted data and the authentication tag to the semiconductor device 2 (S115). Specifically, the control unit 121 reads the encryption data 421 and the authentication tag 422 from the memory 122 as the communication data 42, and outputs the communication data 42 to the communication IF 123 with the semiconductor device 2 as the destination. As a result, the communication IF 123 transmits the communication data 42 to the semiconductor device 2 via the signal line 3.

Since the ECC/EDC is used for data transfer in steps S105, the S107, and the S111, if a failure occurs in the data transfer unit 313 or 324, it can be detected.

Next, the semiconductor device 2 which receives the communication data 42 will be described. First, since the semiconductor device 2 has the same configuration as the semiconductor device 1, the illustration thereof is omitted, the same reference numerals are given in the following explanation, and the following explanation will focus on the differences from the semiconductor device 1.

Figure 7:
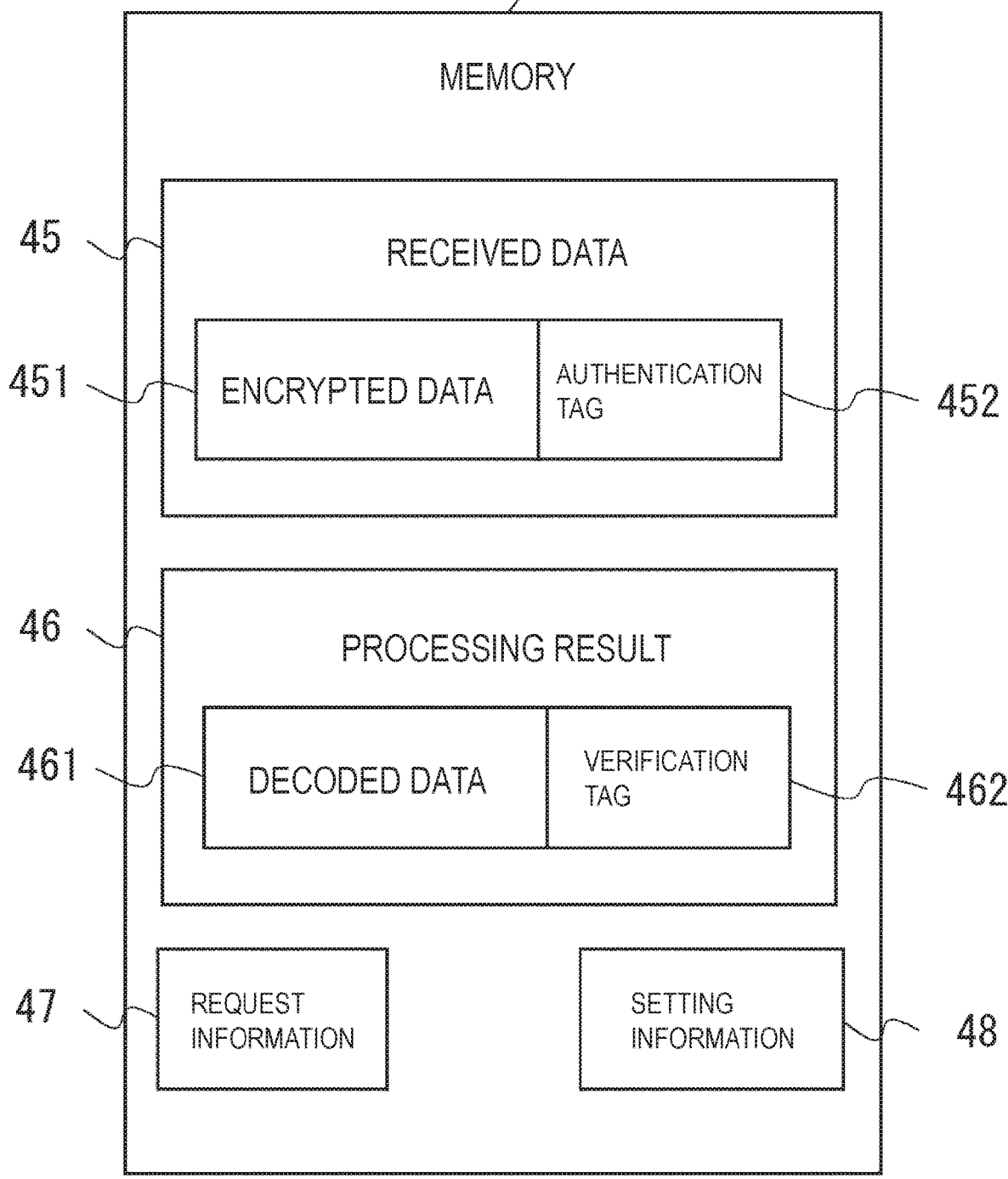
FIG. 7 illustrates an example of data stored in a receiver memory according to the first embodiment.

FIG. 7 is a diagram showing examples of data stored in the memory 122 in the receiving-side semiconductor device 2 according to the first embodiment. The memory 122 stores the received data 45, the processing result 46, the request information 47, and the setting information 48. The received data 45 is communication data 42 received by the semiconductor device 2 from the semiconductor device 1 via the signaling line 3. The received data 45 includes an encrypted data 451 and an authentication tag 452. The encrypted data 451 and the authentication tag 452 are the same data as the encrypted data 421 and the authentication tag 422 described above. The processing result 46 includes decoded data 461 and a verification tag 462. The processing result 46 is a processing result of cryptographic processing (decryption and generation of verification tag) by the cryptographic circuit 314 in the cryptographic unit 113 of the semiconductor device 2. The request information 47 is information used when the control unit 121 of the semiconductor device 2 requests the secure CPU 111 to decrypt the encrypted data 451 (decryption and generation of verification tags). The request information 47 may include the same information as the request information 43 described above. The setting information 48 stores the setting information 3111 or 3211 set in the cryptographic unit 113 by the secure CPU 111 of the semiconductor device 2 in the memory 122.

Figure 8:
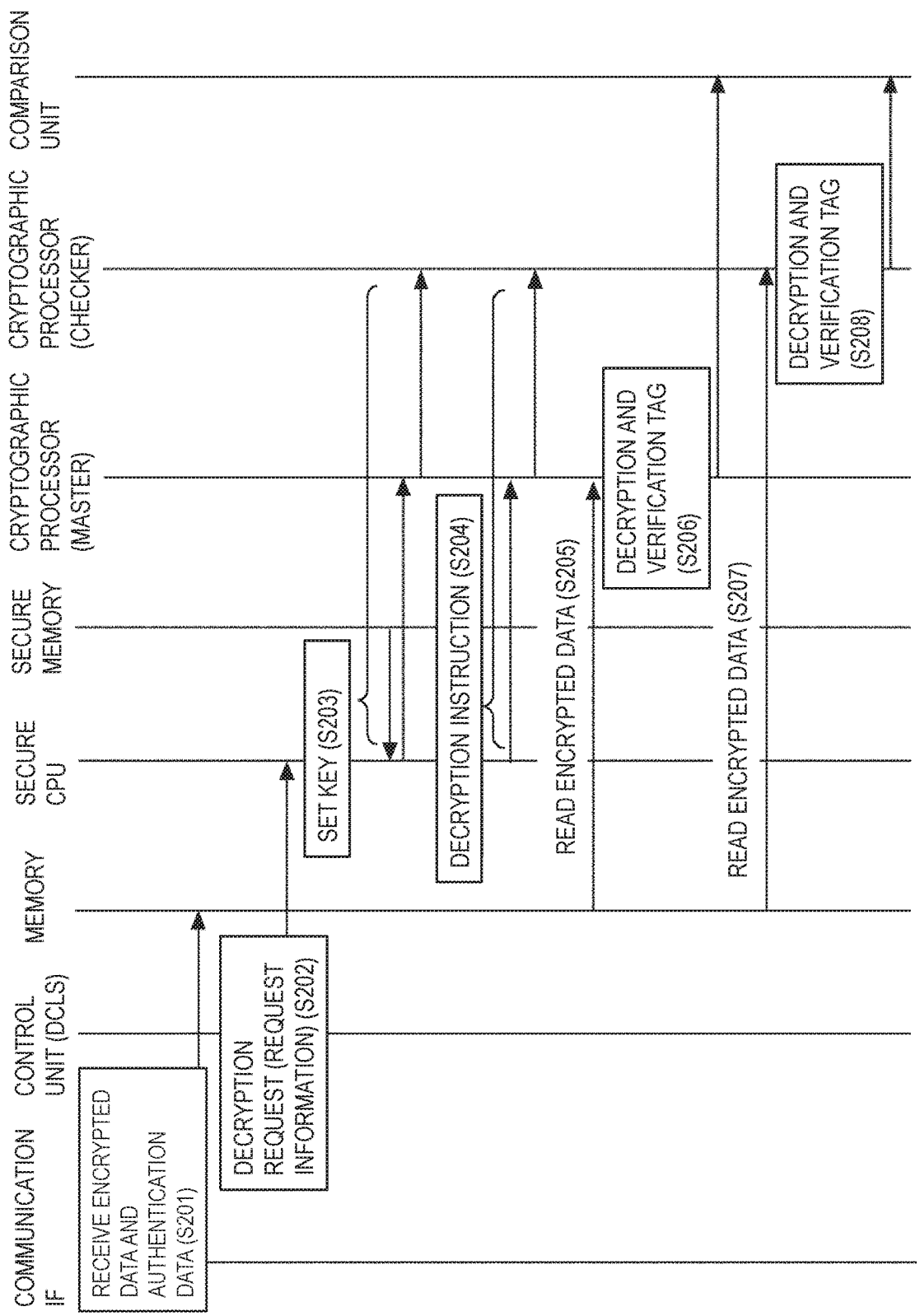
FIG. 8 is a sequence diagram showing a flow of receiving, decrypting and verifying data according to the first embodiment.
Figure 9:
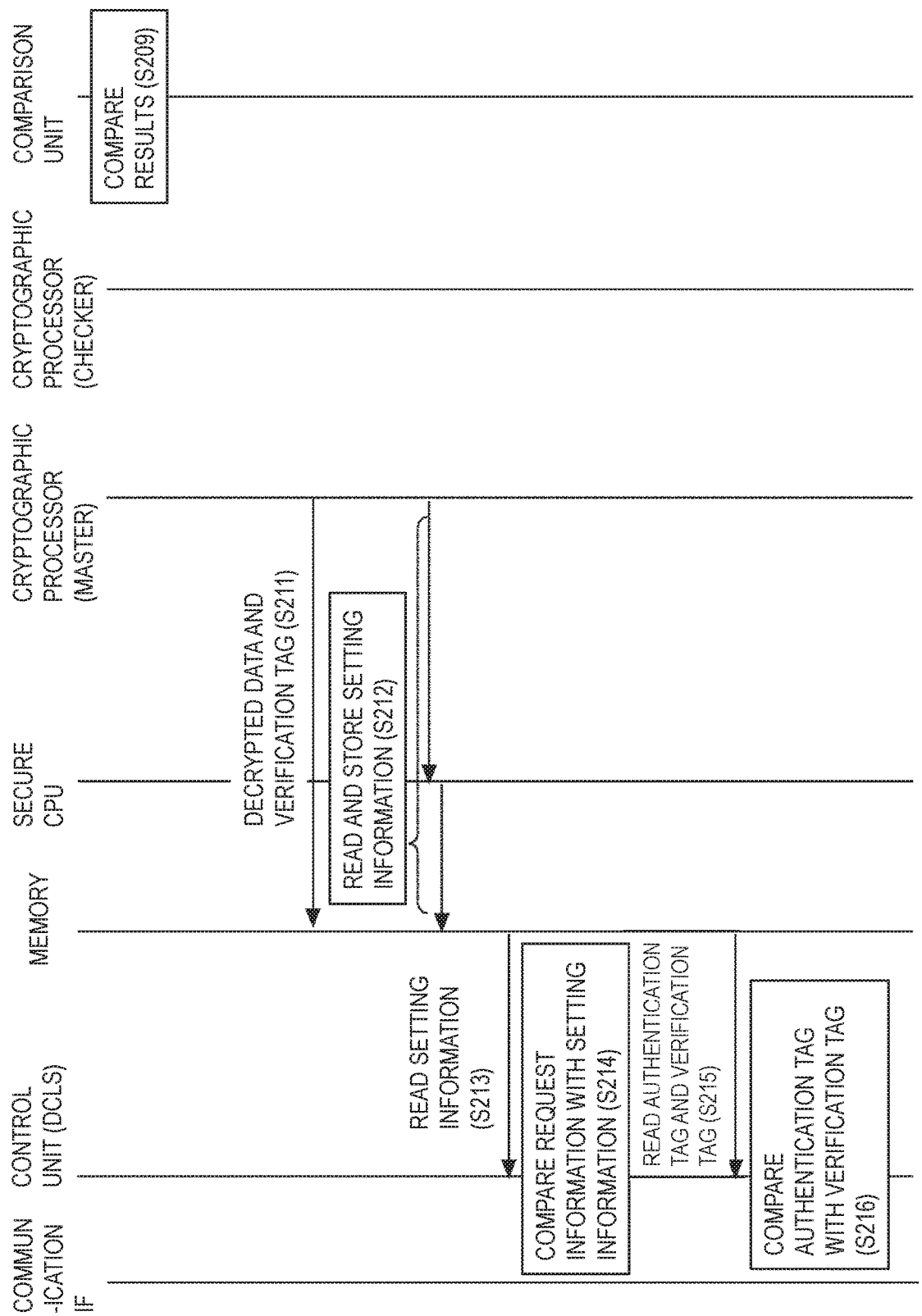
FIG. 9 is a sequence diagram showing a flow of receiving, decrypting and verifying data according to the first embodiment.

FIGS. 8 and 9 are sequence diagrams showing a flow of data reception, decoding, and verification processing according to the first embodiment. First, the communication IF 123 receives the communication data 42, i.e., the encrypted data 421 and the authentication tag 422, from the semiconductor device 1 via the signal line 3, and stores the received data 45 in the memory 122 via the main bus 13 (S201). The control unit 121 may receive the received data 45 from the communication IF 123 and store it in the memory 122.

Next, the control unit 121 makes a decryption request for requesting the secure CPU 111 to decrypt the encrypted data 451 and generate verification tag (S202). The decryption request includes request information 47. The control unit 121 may store the request information 47 in the memory 122 at this timing.

The secure CPU 111 sets a key to the cryptographic unit 113 (S203) in the same manner as the above-described S103 of steps.

Next, the secure CPU 111 issues a decryption instruction to the cryptographic unit 113 in response to a decryption request from the control unit 121 (S204). More specifically, the secure CPU 111 extracts the input/output addresses of the memory 122 and the types of calculation algorithms of the cryptographic process from the request information included in the decryption request, and includes them as setting information in the decryption instruction. The setting of the setting information is the same as the treatment in the cryptographic unit 113 according to the encryption instruction.

Thereafter, the cryptographic processors 31 and 32 perform cryptographic processing independently of each other in response to a decryption instruction from the secure CPU 111. Although the cryptographic processors 31 and 32 are described in this order, they may be processed in parallel or may be different by several clocks.

First, the cryptographic processor 31 reads the encrypted data 451 from the memory 122 in response to the decryption instruction (S205). Next, the cryptographic processor 31 performs decryption and generation of verification tag (S206). Specifically, the cryptographic circuit 314 reads the type of the cryptographic operation algorithm included in the setting information 3111 from the storage unit 311, and specifies the AES-GCM operation mode. The cryptographic circuit 314 reads the key 3112 from the storage unit 311. Then, the cryptographic circuit 314 performs AES-GCM operation on the encrypted data 451 in accordance with the specified operation modes using the key 3112. At this time, the cryptographic circuit 314 decrypts the encrypted data 451 to generate decrypted data, and also generates a verification tag. Then, the cryptographic circuit 314 outputs the generated decrypted data and the verification tag to the comparison unit 33 as a processing result.

Similarly, in response to the decryption instruction, the cryptographic processor 32 reads the encrypted data 451 from the memory 122 (S207), performs decryption and generation of verification tag (S208), and outputs the processing result to the comparison unit 33.

Thereafter, the comparison unit 33 compares the processing results inputted from the cryptographic processors 31 and 32, respectively, and determines whether or not they coincide with each other (S209). When it is determined that the processing results do not coincide with each other, the comparison unit 33 outputs a message indicating that a failure has occurred to the outside of the cryptographic unit 113. The comparison unit 33 may also output the fact that a failure has occurred to the cryptographic circuit 314. Further, the comparison unit 33 may output the presence or absence of a failure to the cryptographic circuit 324.

The cryptographic circuit 314 outputs the decryption data and verification tag generated by the cryptographic circuit to the data transfer unit 313 and stores them in the memory 122 via the ECC/EDC 312 (S211). After the decryption process by the cryptographic unit 113, the secure CPU 111 reads the setting information from the cryptographic unit 113 and stores the setting information in the memory 122 (S212).

Thereafter, the control unit 121 reads out the request information 47 and the setting information 48 from the memory 122 (S213), compares the request information 47 and the setting information 48 (S214), and determines whether or not they coincide with each other. When it is determined that they coincide with each other, the control unit 121 determines that the secure CPU 111 instructs the cryptographic process as requested by the request data 47. If they do not coincide in the S214 of steps, a failure of the secure CPU 111 can be detected.

When it is determined in the step S214 that the request information 47 and the setting information 48 coincide with each other, the control unit 121 reads the authentication tag 452 and the verification tag 462 from the memory 122 (S215), compares the authentication tag 452 and the verification tag 462 with each other (S216), and determines whether or not the authentication tag 452 and the verification tag 462 coincide with each other. If it is determined that they match, the control unit 121 determines that the received data 45 has been authenticated (the authentication result has passed). Therefore, the control unit 121 can proceed with the subsequent processing using the decoded data 461. On the other hand, if they do not coincide with each other in the S216 of steps, the received data 45 cannot be authenticated, so that the control unit 121 discards the decrypted data 461 and the like.

As described above, in the present embodiment, the secure CPU 111 belonging to the secure area 11 is excluded from the DCLS, but the security requirements and the functional safety requirements can be satisfied. Therefore, as compared with the case where the entire secure region 11 is duplicated, an increase in the circuit scale can be suppressed, and functional safety can be coped with at low cost.

Further, the control unit 121 does not apply or confirm the error correction code by the CRC to the data to be encrypted. Therefore, it is possible to suppress the overhead of processing the CRC. In addition, there is no need for duplication or verification of cryptographic processing (encryption or decryption) by software. Thus, the overhead of software processing can be suppressed. Therefore, since the transmitting side and the receiving side can complete the cryptographic processing in one processing, respectively, the data processing can be performed with high efficiency.

As described above, in the present embodiment, the cryptographic engine part (cryptographic unit 113) is DCLS encrypted, and the respective cryptographic engines are provided with data-transferring units, and ECC/EDC is given to the data-transferring units. Therefore, the application of the security service to the functional safety-related data can be implemented at low cost and with high efficiency.

The present embodiment can also be understood as follows. First, the present embodiment can detect a failure in the secure area 11 in the semiconductor device. As a means for this purpose, the cryptographic processor is made redundant, and the processing results of the respective cryptographic processing units are compared by the comparison unit. This makes it possible to detect a failure in the cryptographic processing by the cryptographic engine.

As another method, data transfer units are provided in the cryptographic engines, and direct data transfer is performed with the memory 122 in the non-secure area 12 by using the ECC/EDC (without using the secure CPUs). As a result, it is possible to detect a communication failure between the secure area 11 side and the memory 122 on the non-secure area 12 side.

As another means, request information when the processor on the non-secure area 12 side requests encryption processing to the secure CPU on the secure area 11 side is held in the memory 122. Then, the setting information when the secure CPU instructs the encryption engine is stored in the memory 122 on the non-secure area 12 side. Thereafter, the processor on the non-secure area 12 side verifies the secure CPU by comparing the setting information with the request information. As a result, it is possible to detect a failure without making the secure CPU redundant.

The present embodiment can also be expressed as follows. That is, the semiconductor device according to the present embodiment includes a control unit, a memory, a secure memory, an encryption unit, a secure processor, a first bus, and a second bus. Here, the control unit is made redundant by a plurality of processors. The memory stores target data. The secure memory stores a key used for cryptographic processing for encryption or decryption. The cryptographic unit performs the cryptographic processing. The secure processor instructs the encryption unit to perform the encryption process in response to a request from the control unit. A first bus communicatively connects the controller, the memory, the cryptographic unit, and the secure processor. A second bus communicatively connects the secure memory, the cryptographic unit, and the secure processor. The controller communicates with the memory via a predetermined error detection mechanism. The cryptographic unit includes a plurality of cryptographic processors that independently perform the cryptographic processing on the target data using the key based on the instruction. Each of the plurality of cryptographic processors includes a data transfer unit that performs data transfer with the memory via the error detection mechanism.

As a result, it is possible to detect the fraud of the communication between the secure area and the non-secure area without redundancy of the secure processor. Since the cryptographic processors is made redundant, for example, even if the result of the cryptographic processing is compared and verified by the control unit, it is possible to detect a failure of the cryptographic processing. In addition, an increase in the circuit scale can be suppressed as compared with redundancy of the entire secure area.

The cryptographic unit may further include a failure detection circuit for comparing the treatment results of the cryptographic processing of each of the plurality of cryptographic processing units to detect a failure of any of the cryptographic processors. As described above, by performing comparison by hardware processing, it is possible to speed up detection of faults between redundant cryptographic engines.

Further, the first cryptographic processor of the plurality of cryptographic processors may store the processing result of its own cryptographic processing in the memory using the data transfer unit. The other cryptographic processor among the plurality of cryptographic processors may discard the processing result of their own cryptographic processing. As a result, only the processing result of the encryption engine of the master is transferred, and the transfer amount can be minimized.

Further, it is preferable that the secure processor stores setting information relating to the cryptographic processing set in the cryptographic unit in the instruction in the memory, and the control unit detects a failure of the secure processor based on request information used for the request to the secure processor and the setting information stored in the memory. Thus, a failure can be detected without redundancy of the secure processor.

Further, the secure processor may include an address, which is an access destination in the memory included in the request information, in the setting information and may set the address in the encryption unit, and the data transfer unit may access the address in the memory. As a result, data transfer can be efficiently performed.

When the target data is data to be transmitted to another semiconductor device, it is preferable that each of the plurality of cryptographic processors performs encryption and generation of a message-authenticating code for the target data using the key as the cryptographic processing based on the instruction. This makes it possible to satisfy security requirements and functional security requirements for cryptographic processing at the time of transmission.

When the target data is received data from another semiconductor device, it is preferable that each of the plurality of cryptographic processors decrypt the target data using the key and generate a first message-authenticating code as the cryptographic processing based on the instruction. This makes it possible to satisfy security requirements and functional security requirements for cryptographic processing at the time of reception.

It is further assumed that the received data includes encrypted data encrypted from predetermined data using the key in the other semiconductor device and a generated second message-authenticating code. In this case, at least the first cryptographic processor of the plurality of cryptographic processor may store the decrypted data and the first message authentication code in the memory using the data transfer unit. The controller may compare the first message authentication code and the second message authentication code stored in the memory to detect a failure of the first cryptographic processor. As a result, message authentication can be performed more appropriately.

The present embodiment can also be expressed as follows. That is, the semiconductor device according to the present embodiment includes a control unit, a memory, a secure memory, an cryptographic unit, a secure processor, a first bus, and a second bus. Here, the control unit is made redundant by a plurality of processors. The memory stores target data. The secure memory stores a key used for cryptographic processing for encryption or decryption. The cryptographic unit performs the cryptographic processing. The secure processor instructs the encryption unit to perform the encryption process in response to a request from the control unit. A first bus communicatively connects the controller, the memory, the cryptographic unit, and the secure processor. A second bus communicatively connects the secure memory, the cryptographic unit, and the secure processor. The controller communicates with the memory via a predetermined error detection mechanism. The cryptographic unit includes a plurality of cryptographic processors that independently perform the cryptographic processing on the target data using the key based on the instruction. The secure processor stores, in the memory, setting information relating to the cryptographic processing set in the cryptographic unit in the instruction. The control unit detects a failure of the secure processor based on the request information used for the request to the secure processor and the setting information stored in the memory.

As a result, it is possible to detect a failure in communication between the secure area and the non-secure area without redundancy of the secure processor. Since the cryptographic processor is made redundant, for example, even if the result of the cryptographic processing is compared and verified by the control unit, it is possible to detect a failure of the cryptographic processing. In addition, an increase in the circuit scale can be suppressed as compared with redundancy of the entire secure area.

Alternatively, the present embodiment can be expressed as follows. That is, the semiconductor device control method according to the present embodiment is a method for controlling the above-described semiconductor device. The secure processor instructs the cryptographic unit to perform the cryptographic process in response to a request from the control unit. Each of the plurality of cryptographic processors acquires the target data from the memory via the error detection mechanism based on the instruction, and performs the cryptographic processing on the target data using the key. Thereafter, at least one of the plurality of cryptographic processors stores the processing result of its own cryptographic processing in the memory via the error detection mechanism. This achieves the same effect as described above.

Second Embodiment

The second embodiment is an improvement example of the first embodiment described above. In the second embodiment, a tag comparator is added to the cryptographic processor. The tag comparator itself does not necessarily need to be redundant. That is, at least the first cryptographic processor of the plurality of cryptographic processors further includes a comparator for comparing the second message authentication code acquired from the memory using the data transfer unit with the first message authentication code. It is assumed that the received data includes encrypted data encrypted from predetermined data using the key in the other semiconductor device and the generated second message-authenticating code. As a result, the comparison processing between the authentication tag 452 and the verification tag 462 on the non-secure area 12 side becomes unnecessary, and the processing load of the software by the CPU can be reduced as compared with the first embodiment.

Further, the first cryptographic processor may store the decrypted data and the comparison result by the comparator in the memory using the data transfer unit, and the control unit may discard the decrypted data when the comparison result stored in the memory indicates a mismatch.

Figure 10:
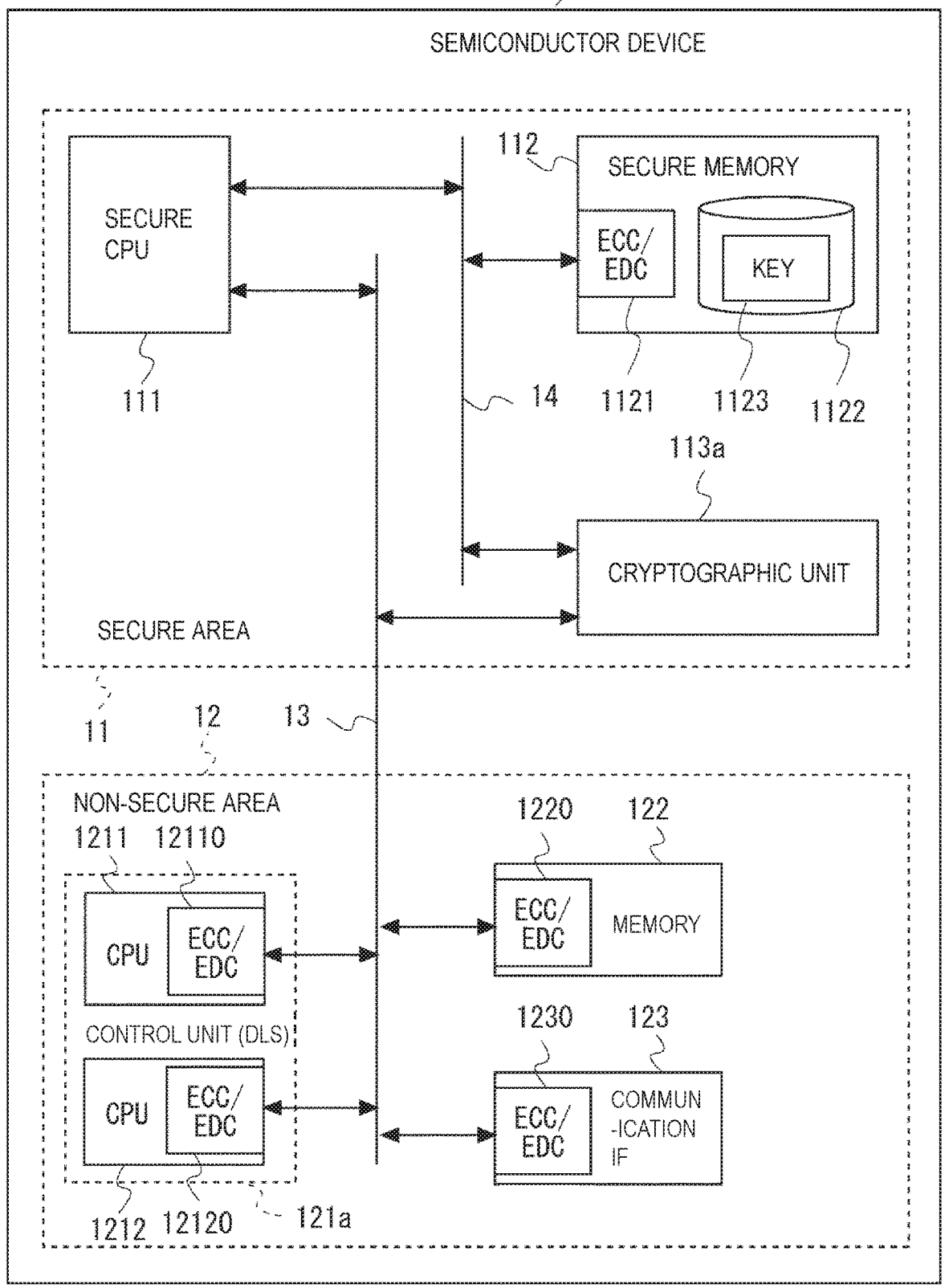
FIG. 10 is a diagram showing a configuration of a semiconductor device according to a second embodiment.

Here, since the concepts of communication between the two semiconductor devices 1 and 2 according to the second embodiment are the same as those in FIG. 1 described above, illustration and explanation are omitted. FIG. 10 is a block diagram showing a configuration of a receiving-side semiconductor device 2a according to the second embodiment. The semiconductor device 2 a has substantially the same configuration as the semiconductor devices 1 and 2 described above, but the cryptographic unit 113a and the control unit 121a are changed.

Figure 11:
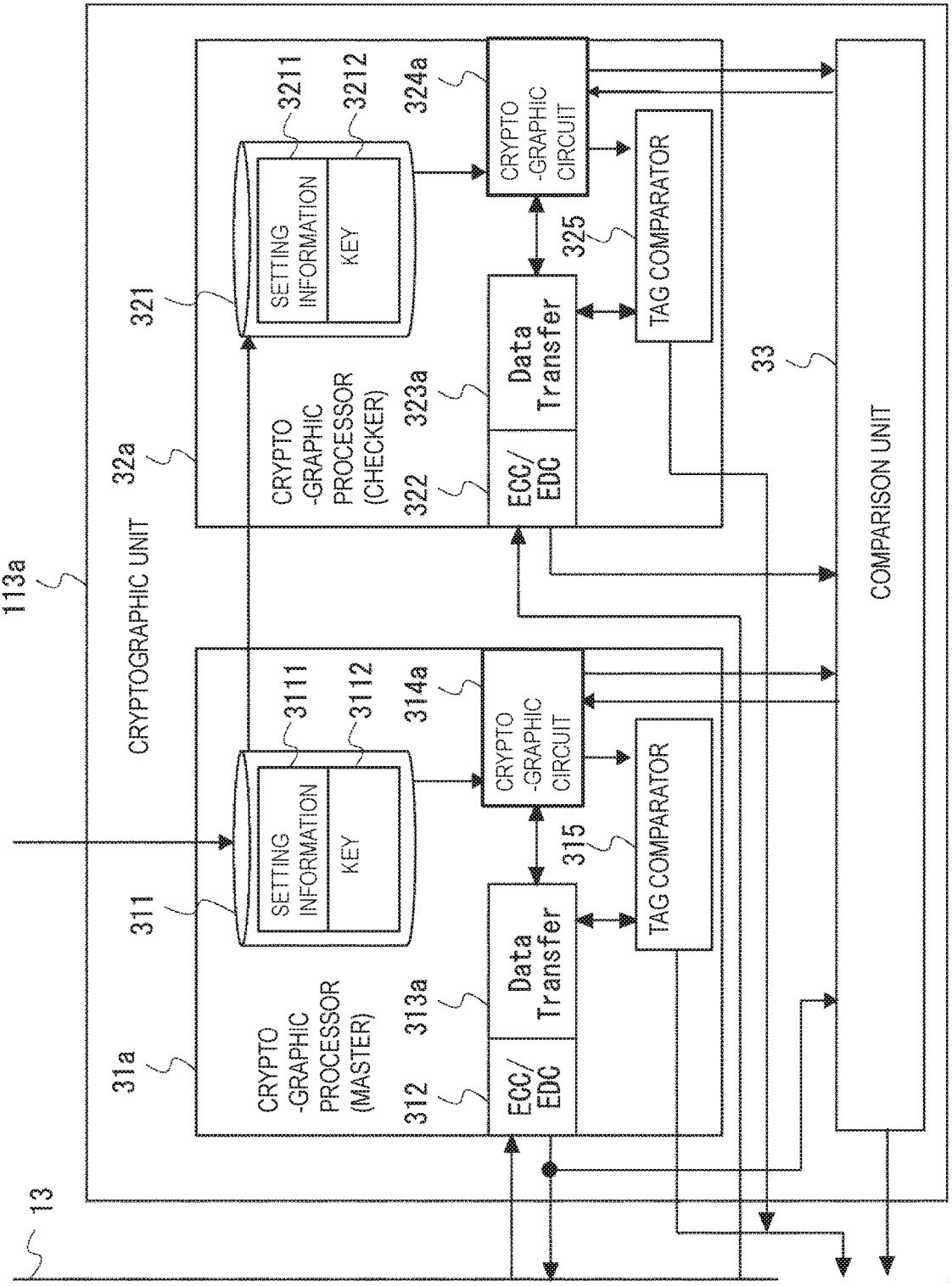
FIG. 11 is a block diagram showing an internal configuration of an encryption unit according to the second embodiment.

FIG. 11 is a block diagram showing an internal configuration of the cryptographic unit 113a according to the second embodiment. The cryptographic unit 113a includes an cryptographic processor 31a, an encryption processor 32a, and a comparison unit 33. In the following description, the difference from the cryptographic unit 113 in FIG. 3 will be mainly described, and the description thereof will be omitted because the other configurations are the same.

The cryptographic processor 31a is different from the cryptographic processor 31 in that it includes a data transfer unit 313a, a cryptographic circuit 314a, and a tag comparator 315. In addition to the process of the data transfer unit 313, the data transfer unit 313a acquires the authentication tag 452 from the memory 122 and outputs it to the tag comparator 315. In addition to the process of the cryptographic circuit 314, the cryptographic circuit 314a also outputs the generated verification tag to the tag comparator 315. The tag comparator 315 compares the verification tag generated by the cryptographic circuit 314 with the authentication tag 452 acquired from the memory 122, and determines whether or not they match. The tag comparator 315 outputs the determination result, that is, the tag comparison result, to the data transfer unit 313a, and stores the data in the memory 122 via the ECC/EDC 312. In addition, the tag comparator 315 may determine that the tag comparison result is inconsistent with the tag comparison result, and output the result to the outside of the cryptographic unit 113a. The cryptographic circuit 314a may not output the verification tag to the data transfer unit 313a. That is, the cryptographic unit 113a may not include the verification tag generated by the master in the processing result.

Similarly, the cryptographic processor 32a includes a data transfer unit 323a, a cryptographic circuit 324a, and a tag comparator 325, which are different from the cryptographic processor 32. The data transfer unit 323a, the cryptographic circuit 324a, and the tag comparator 325 are substantially the same as the data transfer unit 313a, the cryptographic circuit 314a, and the tag comparator 315. However, unlike the tag comparator 315, the tag comparator 325 does not have to output the tag comparison result to the data transfer unit 313a.

Returning to FIG. 10, the description will be continued. The control unit 121a differs from the control unit 121 in the software to be executed, and does not compare the authentication tag with the verification tag. Instead, if the tag comparison result stored in the memory 122 indicates a mismatch, the control unit 121a discards the decoded data.

The same configuration as that of the semiconductor device 2a can be used for the transmission-side semiconductor device according to the second embodiment.

Figure 12:
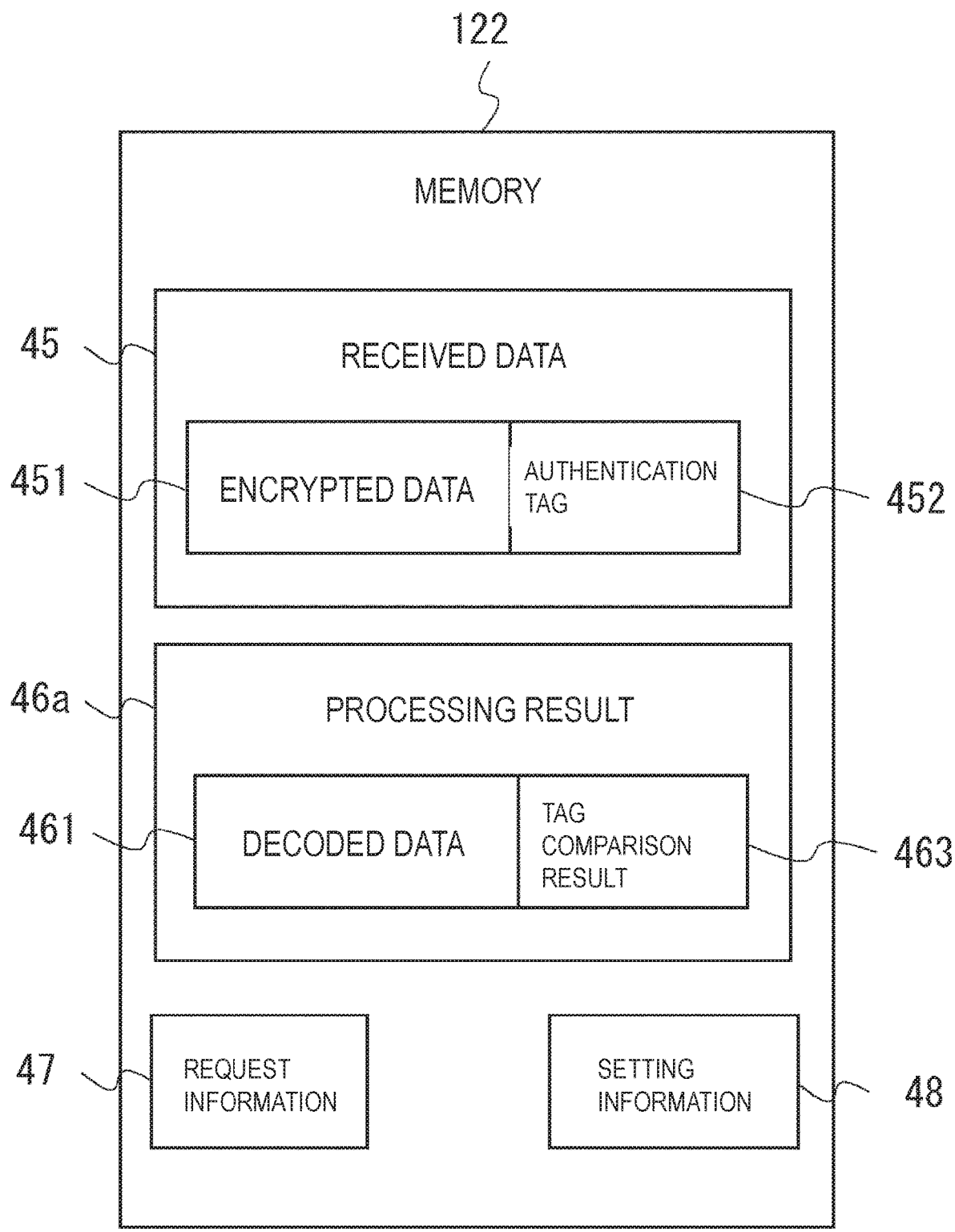
FIG. 12 illustrates an example of data stored in a receiver memory according to the second embodiment.

FIG. 12 is a diagram showing examples of data stored in the memory 122 in the receiving-side semiconductor device 2a according to the second embodiment. As a difference from FIG. 7, the memory 122 includes a tag comparison result 463 in the processing result 46a. As described above, the tag comparison result 463 is a result of comparison between the authenticating tag 452 and the verifying tag by the tag comparator 315 in the cryptographic unit 113a of the semiconductor device 2a, for example, flag data.

FIGS. 13 and 14 are sequence diagrams showing a flow of data reception, decoding, and verification processing according to the second embodiment. Here, since steps S201 to S208 in FIG. 8 are the same, illustration and explanation are omitted. After the step S208, the tag comparator 315 of the cryptographic processor 31a reads the authenticating tag 452 from the memory 122 according to the verifying tag outputted from the cryptographic processor 314a (S310). Then, the tag comparator 315 compares the authenticating tag 452 and the verifying tag, and determines whether or not they coincide with each other (S311). The tag comparator 315 outputs the tag comparison result to the data transfer unit 313a.

Similarly, the tag comparator 325 of the cryptographic processor 32a reads the authenticating tag 452 from the memory 122 in response to the verifying tag outputted from the cryptographic processor 324a (S312). Then, the tag comparator 325 compares the authenticating tag 452 and the verifying tag, and determines whether or not they coincide with each other (S313). If, in a step S311 or S313, a mismatch is determined, the tag comparator 315 or 325 may output to the outside of the cryptographic unit 113a that authentication of the received data 45 has failed.

Before, after, or in parallel with the S313 from the step S310, the comparing unit 33 compares the processing results inputted from each of the cryptographic processors 31a and 32a (S314) in the same manner as in the step S209, and when the processing results do not coincide with each other, the comparing unit 33 outputs the fact that there is a failure to the outside of the cryptographic unit 113a.

The cryptographic circuit 314 outputs the decryption data generated by the cryptographic circuit to the data transfer unit 313. Therefore, the data transferring unit 313 stores the decrypted data acquired from the cryptographic circuit 314 and the tag comparing result acquired from the tag comparator 315 in the memory 122 via the ECC/EDC 312 (S316). After the cryptographic process by the cryptographic unit 113a, the secure CPU 111 reads the setting information from the cryptographic unit 113a and stores the setting information in the memory 122 (S317).

Thereafter, the control unit 121 reads out the request information 47 and the setting information 48 from the memory 122 (S318), compares the request information 47 and the setting information 48 (S319), and determines whether or not they coincide with each other. When it is determined that they coincide with each other, the control unit 121 determines that the secure CPU 111 instructs the cryptographic process as requested by the request data 47. If they do not coincide in the S319 of steps, a failure of the secure CPU 111 can be detected.

Then, when it is determined in the S319 of steps that the request information 47 matches the setting information 48, the control unit 121 reads the tag comparison result 463 from the memory 122 (S320), and confirms the flag information indicated by the tag comparison result 463 (S321). That is, the control unit 121 checks whether or not the authentication tag 452 matches the verification tag generated by the cryptographic processing unit 31a. When the tag comparison result 463 indicates a match, the control unit 121 determines that the received data 45 has been authenticated. Therefore, the control unit 121 can proceed with the subsequent processing using the decoded data 461. On the other hand, if they do not coincide with each other in the S321 of steps, the received data 45 cannot be authenticated, so that the control unit 121 discards the decrypted data 461 and the like.

As described above, in the second embodiment, the processing load of the software by the CPU can be reduced as compared with the first embodiment.

Although the invention made by the inventor has been specifically described based on the embodiment, the present invention is not limited to the embodiment already described, and it is needless to say that various modifications can be made without departing from the gist thereof.

What is claimed is:

1. A semiconductor device comprising:
a controller that 1) generates a cryptographic request with request information including an address of target data and 2) includes a master processor and a checker processor that execute a same process as one another in a lock step, a result of the checker processor being compared with a result of the master processor;
a memory that stores the request information;
a secure memory that stores a key used for encryption or decryption;
a secure processor that generates a cryptographic instruction with setting information including an address extracted from the request information in response to the cryptographic request from the controller;
a cryptographic unit including a master cryptographic processor and a checker cryptographic processor that perform a same cryptographic process as one another, using the key, on data stored in the extracted address of the memory based on the setting information, a processing result of the checker cryptographic processor being compared with a processing result of the master cryptographic processor;
a first bus coupled to the controller, the memory, the cryptographic unit, and the secure processor; and
a second bus coupled to the secure memory, the cryptographic unit, and the secure processor,
wherein the controller communicates with the memory via a predetermined error detection mechanism,
wherein each of the master cryptographic processor and the checker cryptographic processor includes a data transfer unit that performs a data transfer with the memory via the error detection mechanism, and
wherein the controller detects a failure of the secure processor by comparing the address of target data included in the request information stored in the memory with the address included in the setting information after the cryptographic process.

2. The semiconductor device according to claim 1, wherein the master cryptographic processor stores the processing result of the master cryptographic processor in the memory using the data transfer unit, and the checker cryptographic processor discards the processing result of the checker cryptographic processor.

3. The semiconductor device according to claim 1, wherein each of the master cryptographic processor and the checker cryptographic processor performs, as the cryptographic process, encryption for the data and generation of a message authenticating code using the key when the data is data to be transmitted to another semiconductor device.

4. The semiconductor device according to claim 1, wherein each of the master cryptographic processor and the checker cryptographic processor decrypts the data and generates a first message authenticating code as the cryptographic process when the data is received data from another semiconductor device.

5. The semiconductor device according to claim 4,
wherein the received data includes encrypted data using the key and a second message authentication code generated by the other semiconductor device,
wherein at least the master cryptographic processor stores the decrypted data and the first message authentication code in the memory using the data transferring unit, and
wherein the controller compares the first message authentication code and the second message authentication code stored in the memory to detect a failure of the master cryptographic processor.

6. The semiconductor device according to claim 4,
wherein the received data includes encrypted data using the key and a second message authentication code generated by the other semiconductor device, and
wherein at least the master cryptographic processor further comprises a comparator that compares the second message authentication code obtained from the memory using the data transfer unit with the first message authentication code.

7. The semiconductor device according to claim 6, wherein the master cryptographic processor stores the decrypted data and the comparison result by the comparator in the memory using the data transferring unit, and the controller discards the decrypted data when the comparison result stored in the memory indicates a mismatch.

8. The semiconductor device according to claim 1,
wherein the request information further includes a type of cryptographic algorithm,
wherein the setting information further includes the type of cryptographic algorithm extracted from the request information, and
wherein the master processor and the checker cryptographic processor perform the same cryptographic process corresponding to the extracted type of cryptographic algorithm, and
wherein the controller detects a failure of the secure processor by comparing the address of target data included in the request information with the address included in the setting information and by comparing the type of cryptographic algorithm included in the request information with the type of cryptographic algorithm included in the setting information.

9. The semiconductor device according to claim 1,
wherein the first bus and the second bus are independent of each other, and
wherein the controller is inaccessible to the second bus.

* * * * *